March 6, 1951  V. L. SNOW ET AL  2,543,811
AXLE WITH WHEEL-TYPE PLANETARY DRIVE
Filed Feb. 1, 1946  2 Sheets-Sheet 1

INVENTORS.
VIRGIL L. SNOW
WALTER F. DOUBLE
BY
Hyde, Meyer, Baldwin & Doran
ATTORNEYS Patented Mar. 6, 1951

2,543,811

UNITED STATES PATENT OFFICE 2,543,811

AXLE WITH WHEEL-TYPE PLANETARY DRIVE

Virgil L. Snow, Beverly Hills Drive, and Walter F. Double, Wickliffe, Ohio, assignors to The Euclid Road Machinery Co., Euclid, Ohio, a corporation of Ohio Application February 1, 1946, Serial No. 644,936

1 Claim. (Cl. 74—801)

This invention relates to improvements in a wheel-type planetary drive.

An object of the present invention is to provide a planetary drive housed in a vehicle wheel wherein radial bearings are omitted in the planetary structure, while proper provision is made for absorbing end-thrust so that the planetary operates on the floating gear principle.

Another object of the present invention is to provide a novel arrangement of a planetary drive in a wheel housing wherein means is provided for preventing a relatively free-flowing axle lubricant from working through the wheel housing and into the brake structure.

Still another object of the present invention is to provide a wheel-type planetary drive of a simple but very strong structure so that long life is assured with the proper positioning of the parts in their driving relationship.

Other objects and advantages of the present invention will be apparent from the accompanying drawings and description and the essential features thereof will be set forth in the appended claim.

In the drawings,

Fig. 3 is a central sectional view through the internal ring gear shown in Figs. 1 and 2, while

Figure 1:
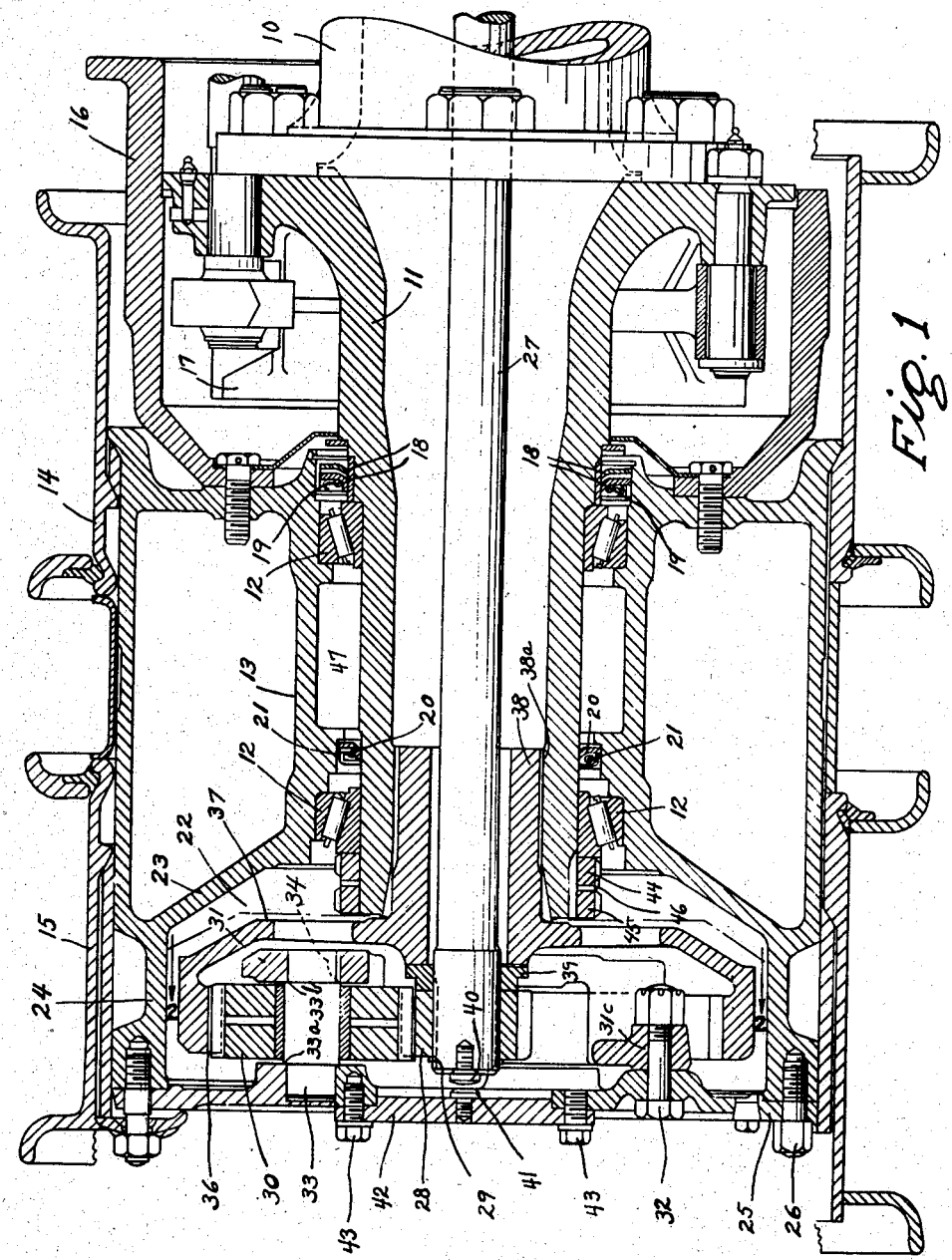
Fig. 1 is a central sectional view showing a drive shaft, an axle, a wheel drum, and our improved planetary drive.
Figure 2:
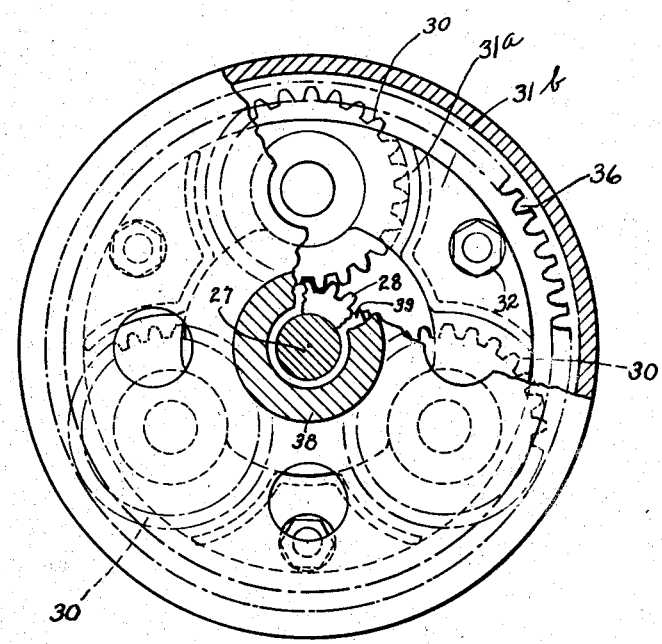
Fig. 2 is a sectional view taken along the line 2—2 of Fig. 1 and broken away in part to more clearly show the construction.

Referring first to the general structure of Fig. 1 as showing the background of the invention, an axle housing 10 of an automotive vehicle or the like is connected by suitable bolt connections to the hollow wheel axle 11. Rotatably mounted on this axle by means of suitable tapered roller bearings 12 is the wheel drum 13 on which are mounted the rims 14 and 15 for the reception of suitable tires. Bolted to the wheel drum is the brake drum 16 which cooperates with an internal brake shoe 17 operated by the usual type of mechanism, a part of which is indicated. This brake mechanism is protected against oil and grease working back from the wheel end of the assembly by several means. One seal comprises the flexible sealing strips 18 resiliently held against the sealing surface by a circular spiral spring 19. Another seal of similar type comprises the flexible annular sealing ring 20 spring pressed to sealing position by the circular spiral spring 21.

The outer end of the housing provides a hollow chamber 22 which is closed at its inner central portion by the hub of the ring gear presently to be described. Outwardly therefrom the frusto-conical walls 23 join with the generally cylindrical wall 24 to form a grease-tight housing. The hollow chamber 22 is closed at its laterally outward end by means of the cover plate 25 secured to the wall portion 24 by the studs 26.

The drive means comprises the usual floating drive shaft 27 which is provided with suitable bearings, not shown, laterally toward the right as viewed in Fig. 1 but the outer end of the shaft shown at the left of Fig. 1 is free to move radially because of the clearance between shaft 27 and hub 38. Splined to this shaft is a sun gear 28 held in place by the snap ring 29. Three planet gears 30 are rotatably mounted 120 degrees apart on a carrier plate 31. This carrier plate has three raised portions 31a adapted to span the thickness of a gear 30, and three intermediate lower portions 31b provided with bolt holes 31c to receive bolts 32 which hold the carrier plate rigidly to the cover plate 25. Each planet gear 30 is carried by a short shaft 33 which is keyed to the carrier plate 31 by a key 34. Thus, the shaft 33 is stationary and each gear 30 rotates on its associated shaft and is provided with suitable bearings. Each shaft has a shoulder 33a which bears against the cover plate 25 and a shoulder 33b which bears against the carrier plate 31 when the bolts 32 are drawn home.

Figure 3:
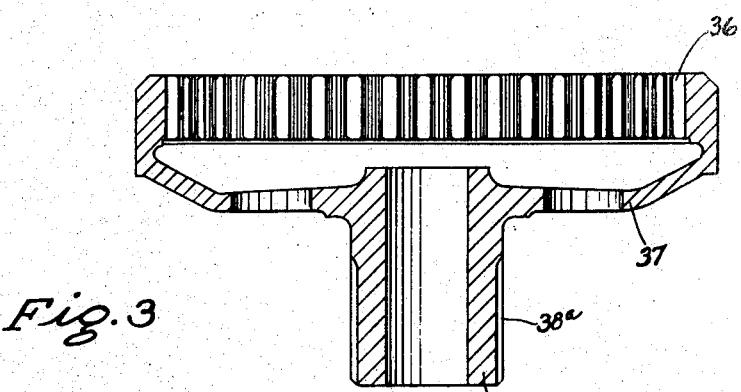
Figure 4:
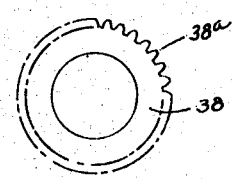
Fig. 4 is an end elevational view showing the lower end of the hub portion of Fig. 3.

An internally toothed ring gear 36 meshes with the three planet gears 30. This ring gear is of novel construction which holds the gear stationary and properly centered with respect to the rest of the planetary system. This construction comprises a spider 37 integral with the ring gear and a hub 38 integral with the spider. This ring gear construction is clearly shown in Figs. 3 and 4 where the parts just mentioned are shown separately. Splines 38a on the hub engage coacting splines on the interior wall of axle 11. The outer end of the hub portion 38 is held spaced from the pinion 28 by means of a spacing collar 39.

The end-thrust of the drive axle 27 is resisted by the hardened button 40 in the outer end of shaft 27 abutting a similar hardened button 41 carried by hub cap 42 which is secured by bolts 43 to the cover plate 25.

It is obvious from the above construction that the outer end of shaft 27 floats in the planetary system and the entire assembly of planetary gearing and shaft 27 is held centered by the ring gear construction 36, 37, 38 which holds everything concentric with the axle sleeve portion 11. It is also obvious that the entire construction is readily disassembled when desired. By removing hub cap 42 shaft 27 and its pinion 28 may be withdrawn outwardly. By removing cover plate 25 the entire planetary system may be withdrawn outwardly, at which time the carrier plate 31 will be removed along with cover plate 25 bringing the three planet gears 30 out with it. The ring gear 36 may then be removed, if desired, by simply pulling the same laterally outwardly in a direction to disengage the splines 28a.

It will be noted that the taper bearing 12 at the left-hand, as viewed in Fig. 1, is held in place by nuts 44 and 45 and lock washer 46. The space between the taper bearings represented largely by the annular chamber 47 is packed with a highly viscous lubricant such as a heavy grease. This is held against outward movement by the seal 20 and is held against inward movement by the seal 18. The chamber 22 in which the planetary system is housed and the interior of the axle portion 11 is filled with a readily flowable lubricant such as is usually used for lubricating gears. This readily flowable lubricant is very harmful if it gets on the braking system of the vehicle. By the above construction we have interposed the chamber 47 of difficultly flowable lubricant sealed at both ends by the seals 18 and 20, and this prevents the readily flowable lubricant in chamber 22 reaching the brakes 17.

What we claim is:

In a wheel-type planetary drive having a hollow wheel axle, having a wheel drum rotatably mounted on said axle, having a drive shaft passing through the hollow of said axle, having a housing connected with said drum, said housing having an opening at its outer side, having a planetary gear system in said housing, said system comprising a sun gear rotatable with said shaft and planet gears meshing with said sun gear and a stationary internally toothed ring gear meshing with said planet gears, and having a cover plate for said opening secured to said housing, said drive shaft being free of engagement with said cover plate, the improvement comprising a spider and annular hub integral with said ring gear, said hub positioned between said shaft and said hollow axle and having a non-rotatable connection with the inner surface of said hollow axle, there being clearance between said shaft and hub to permit floating of said shaft radially, a stub shaft for each of said planet gears, each stub shaft having one end mounted in said cover plate, a carrier plate rigidly secured to said cover plate and each stub shaft having its other end mounted in said carrier plate.

VIRGIL L. SNOW.
WALTER F. DOUBLE.

REFERENCES CITED

The following references are of record in the file of this patent:

UNITED STATES PATENTS

| Number | Name | Date |
| --- | --- | --- |
| 1,380,547 | Farmer | June 7, 1921 |
| 1,442,795 | Cook | Jan. 23, 1923 |
| 1,464,887 | Starr | Aug. 14, 1923 |
| 1,467,939 | Knap | Sept. 11, 1923 |
| 1,783,780 | Evans | Dec. 2, 1930 |
| 1,842,217 | Tracey | Jan. 19, 1932 |
| 2,135,477 | Griswold | Nov. 1, 1938 |
| 2,337,884 | Haefeli | Dec. 28, 1943 |
| 2,386,917 | Thornton | Oct. 16, 1945 |
| 2,403,579 | Carpenter | July 9, 1946 |
| 2,408,336 | Orr | Sept. 24, 1946 |
| 2,424,578 | Mortog | July 29, 1947 |